United States Patent [19]
Jensvold et al.

[11] Patent Number: 5,141,530
[45] Date of Patent: Aug. 25, 1992

[54] POLYCARBONATE, POLYESTER, AND POLYESTERCARBONATE SEMI-PERMEABLE GAS SEPARATION MEMBRANES POSSESSING IMPROVED GAS SELECTIVITY AND RECOVERY, AND PROCESSES FOR MAKING AND USING THE SAME

[75] Inventors: John A. Jensvold, Benica; Tsungnan Cheng, San Ramon, both of Calif.; Donald L. Schmidt, Midland, Mich.

[73] Assignee: The Dow Chemical Company, Midland, Mich.

[21] Appl. No.: 749,002

[22] Filed: Aug. 22, 1991

[51] Int. Cl.$^5$ .................. B01D 53/22; B01D 71/48; B01D 71/50
[52] U.S. Cl. ........................... 55/16; 55/158; 264/41
[58] Field of Search .............. 55/16, 68, 158; 264/41

[56] References Cited

U.S. PATENT DOCUMENTS

| | | | |
|---|---|---|---|
| Re. 30,351 | 7/1980 | Hoehn et al. | 55/16 |
| 3,256,675 | 6/1966 | Robb | 55/16 |
| 3,615,024 | 10/1971 | Michaels | 210/490 |
| 3,709,774 | 1/1973 | Kimura | 161/159 |
| 3,852,388 | 12/1974 | Kimura | 264/41 |
| 3,945,926 | 3/1976 | Kesting | 264/41 X |
| 4,032,309 | 6/1977 | Salemme | 55/158 |
| 4,048,271 | 9/1977 | Kesting | 264/41 |
| 4,075,108 | 2/1978 | Higley et al. | 264/41 X |
| 4,086,310 | 4/1978 | Bottenbruch et al. | 264/41 |
| 4,195,157 | 3/1980 | Mark | 528/174 |
| 4,230,463 | 10/1980 | Henis et al. | 55/16 |
| 4,238,204 | 12/1980 | Perry | 55/16 |
| 4,362,613 | 12/1982 | MacLean | 208/108 |
| 4,367,135 | 1/1983 | Posey, Jr. | 208/108 |
| 4,374,891 | 2/1983 | Ward, III | 428/220 |
| 4,772,392 | 9/1988 | Sanders, Jr. et al. | 210/500.23 |
| 4,818,254 | 4/1989 | Anand et al. | 55/16 |
| 4,838,904 | 6/1989 | Sanders, Jr. et al. | 55/158 |
| 4,840,646 | 6/1989 | Anand et al. | 55/16 |
| 4,843,733 | 7/1989 | Admassu | 34/9 |
| 4,851,014 | 7/1989 | Jeanes | 55/16 |
| 4,874,401 | 10/1989 | Jeanes | 55/16 |
| 4,900,334 | 2/1990 | Admassu et al. | 55/16 |
| 4,955,993 | 9/1990 | Sanders, Jr. et al. | 55/16 |
| 4,959,082 | 9/1990 | Admassu et al. | 55/16 |
| 4,962,131 | 10/1990 | Beck et al. | 521/51 |
| 4,975,228 | 12/1990 | Sanders et al. | 264/41 |
| 5,000,763 | 3/1991 | Sanders et al. | 55/16 |
| 5,032,149 | 7/1991 | Hayes | 55/16 |
| 5,034,024 | 7/1991 | Hayes | 55/158 X |

FOREIGN PATENT DOCUMENTS

| | | |
|---|---|---|
| 0422884A1 | 4/1971 | European Pat. Off. . |
| 136621 | 4/1985 | European Pat. Off. . |
| 376234 | 7/1990 | European Pat. Off. . |
| 376235 | 7/1990 | European Pat. Off. . |
| 53-16373 | 2/1978 | Japan . |
| 53-066880 | 6/1978 | Japan . |
| 58-8511 | 1/1983 | Japan . |
| 58-223411 | 12/1983 | Japan . |
| 59-022724 | 2/1984 | Japan . |
| 59-120206 | 7/1984 | Japan . |
| 529183 | 9/1976 | U.S.S.R. . |
| 2011804A | 7/1979 | United Kingdom . |

OTHER PUBLICATIONS

Barbari et al., "Polymeric Membranes Based on Bisphenol-A For Gas Separations", *Journal of Membrane Science*, vol. 42, 1989.

Muruganandam, University of Texas at Austin, Separations Research Program, paper presented at fall meeting on Oct. 28 and 29, 1985, "Sorption and Transport in Substituted Polycarbonates and Polystyrene/Tetramethyl Polycarbonate Blends".

Chern et al., Chapter 2, "Material Selection for Membrane-Based Gas Separation", *Material Science of Synthetic Membranes*, Lloyd, Ed., American Chemical Society, 1985, pp. 25–46.

Komarova et al., "Interaction of Polyesters with Epoxy Polymers: Insertion of Oxirane Rings Into Ester Bonds", Journal of Polymer Science, Polymer Chemistry Edition, vol. 16, John Wiley & Sons, Inc., 1978, pp. 1643–1657.

*Primary Examiner*—Robert Spitzer
*Attorney, Agent, or Firm*—Janet Pauline Clark

[57] ABSTRACT

The invention is a semi-permeable gas separation membrane having disposed thereon a non-ionic surfactant. The membrane possesses improved selectivity and recovery. The invention includes a process for making such membranes as well as a method of using such membranes.

85 Claims, No Drawings

POLYCARBONATE, POLYESTER, AND POLYESTERCARBONATE SEMI-PERMEABLE GAS SEPARATION MEMBRANES POSSESSING IMPROVED GAS SELECTIVITY AND RECOVERY, AND PROCESSES FOR MAKING AND USING THE SAME

BACKGROUND OF THE INVENTION

This invention relates to a semi-permeable gas separation membrane comprised of polycarbonate, polyester, and/or polyestercarbonate which possesses improved gas selectivity and recovery. The invention further relates to processes for making and using such a membrane.

In various industries, it is necessary or desirable to separate one gaseous component from other gaseous components in a gas mixture. Processes used to perform such separations include cryogenics, pressure swing adsorption, and membrane separations.

Membranes have been used to recover, remove, isolate, or separate a variety of gases, including hydrogen, helium, oxygen, nitrogen, carbon monoxide, carbon dioxide, water vapor, hydrogen sulfide, ammonia, and/or light hydrocarbons, from a mixture of gases. Applications of particular interest include the separation of air into an enriched oxygen stream, which is useful, for example, for increasing the efficiency of fermentation processes and for enhancing combustion processes, and an enriched nitrogen stream, which is useful, for example, for inert padding of flammable fluids and for increasing food storage times. Other applications of interest include the separation of hydrogen or helium from gas mixtures containing gases such as nitrogen, carbon monoxide, carbon dioxide, and/or light hydrocarbons in addition to hydrogen or helium. For example, the separation or recovery of hydrogen or helium is often necessary in various hydrocracker, hydrotreater, and catalytic cracking processes used in the oil refinery industry. Membranes can be used to achieve such separations.

Such membrane separations are based on the relative permeabilities of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the gas mixture. The gas mixture is thereby separated into a stream which is enriched in the selectively permeating gaseous component or components and a stream which is depleted in the selectively permeating gaseous component or components. The stream which is depleted in the selectively permeating gaseous component or components is enriched in the relatively non-permeating gaseous component or components. A relatively non-permeating gaseous component permeates more slowly through the membrane than at least one other gaseous component of the gas mixture. An appropriate membrane material is chosen for the gas mixture so that some degree of separation of the gas mixture can be achieved.

Membranes for gas separation have been fabricated from a wide variety of polymeric materials, including cellulose esters, aromatic polyimides, polyaramides, polysulfones, polyethersulfones, polyphenylene oxides, polyesters, polycarbonates, and polyestercarbonates. An ideal gas separation membrane is characterized by the ability to operate under high temperatures and/or pressures while possessing a high gas separation factor, that is, gas selectivity, and high recovery, while maintaining an acceptable gas permeability. The problem is finding membrane materials which possess all the desired characteristics. Polymers possessing high gas separation factors generally have unacceptably low gas permeabilities, while those polymers possessing high gas permeabilities generally have low gas separation factors. In the past, a choice between a high separation factor and a high gas permeability has been unavoidably necessary. Furthermore, lower than desirable recovery has also been experienced with conventional gas separation membranes. Recovery is defined as the ratio of the volume of the non-permeate gas product stream to the volume of the feed gas stream, at a specified temperature and composition for the non-permeate gas. Conventional membranes typically possess recoveries based on air as the feed gas of less than about 30 percent at 25° C. and 1 percent oxygen concentration in the non-permeate product gas. Such low recoveries translate into higher energy costs and reduced product purity, and therefore, increased product gas cost. In addition, many of the membrane materials previously used exhibit poor separation performance at high operating temperatures and/or pressures.

What is needed is a membrane capable of separating a gaseous component from at least one other gaseous component in a gas mixture which possesses high gas selectivity, high recovery, adequate gas permeability, and ability to operate under conditions of high temperature and/or pressure.

SUMMARY OF THE INVENTION

The invention is a semi-permeable gas separation membrane comprising:

at least one discriminating region and at least one porous region, wherein said discriminating region functions to selectively separate at least one gaseous component from at least one other gaseous component in a gas mixture, wherein said discriminating region and said porous region are comprised of a polymer selected from the group consisting of a polycarbonate, a polyester, a polyestercarbonate, and a combination thereof; wherein said porous region comprises a plurality of pores having an effective average pore size in the range of up to about 500 Angstroms; and a non-ionic surfactant disposed on at least one surface of said membrane, wherein said non-ionic surfactant is characterized by an HLB value of between about 8.0 and about 17.0;

wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

In another aspect, the invention is a process for separating at least one gaseous component from at least one other gaseous component in a gas mixture comprising:

A. contacting one side of a semi-permeable gas separation membrane with a feed gas mixture under pressure, wherein said membrane separates a higher pressure region on one side of the membrane from a lower pressure region on the opposite side of said membrane;

B. maintaining a pressure differential across said membrane under conditions such that at least one gaseous component in the feed gas mixture selectively permeates through the membrane from the higher pressure region to the lower pressure region;

C. removing from the lower pressure region permeated gas which is enriched in at least one gaseous component: and D. removing from the higher pressure region non-permeated gas which is depleted in at least one gaseous component:

wherein said membrane comprises:

at least one discriminating region and at least one porous region, wherein said discriminating region functions to selectively separate at least one gaseous component from at least one other gaseous component in a gas mixture, wherein said discriminating region and said porous region are comprised of a polymer selected from the group consisting of a polycarbonate, a polyester, a polyestercarbonate, and a combination thereof, wherein said porous region comprises a plurality of pores having an effective average pore size in the range of up to about 500 Angstroms; and a non-ionic surfactant disposed on at least one surface of said membrane, wherein said non-ionic surfactant is characterized by an HLB value of between about 8.0 and about 17.0;

wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

In another aspect, the invention is a process for preparing a semi-permeable gas separation membrane comprising;

A. forming a mixture comprising:
  (i) at least one polymer selected from the group consisting of polycarbonate, polyester, polyestercarbonate, and a combination thereof,
  (ii) at least one solvent for said polymer, and
  (iii) optionally, at least one non-solvent for said polymer:

B. heating said mixture to a temperature at which said mixture forms a fluid and possesses sufficient viscosity at extrusion or casting conditions to permit fabrication of a membrane;

C. extruding or casting said fluid into a membrane;

D. passing said membrane through at least one gaseous quench zone under conditions such that said mixture cools and begins to phase separate;

E. passing said membrane through at least one liquid quench zone comprising a liquid in which said polymer possesses low solubility, wherein at least a portion of said solvent and optional non-solvent is removed from said membrane;

F. simultaneously or consecutively passing said membrane through at least one liquid leach zone comprising a liquid in which said polymer possesses low solubility, wherein a substantial portion of the remaining solvent and optional non-solvent is removed from said membrane; and G. contacting at least one surface of said membrane with a non-ionic surfactant which possesses an HLB value of between about 8.0 and about 17.0;

wherein said membrane so formed comprises at least one discriminating region and at least one porous region, wherein said discriminating region functions to selectively separate at least one gaseous component from at least one other gaseous component in a gas mixture; wherein said porous region comprises a plurality of pores having an effective average pore size in the range of up to about 500 Angstroms, and wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

The membranes of this invention demonstrate surprisingly high gas separation factors and recoveries with adequate gas permeabilities for the separation of at least one gaseous component from at least one other gaseous component in a gas mixture. In particular, the membranes of this invention are useful for the separation of hydrogen or helium from gas mixtures containing hydrogen or helium, as well as for the separation of oxygen and nitrogen from air.

DETAILED DESCRIPTION OF THE INVENTION

The membranes of this invention have at least one discriminating region and at least one generally porous region, wherein the discriminating region functions to selectively separate at least one gaseous component from at least one other gaseous component in a gas mixture, wherein the discriminating region and porous regions are comprised of polycarbonate, polyester, polyestercarbonate, or a combination thereof.

The membrane may be in the form of a film or sheet or hollow fiber of various cross-sectional shapes. Preferably, in the case of a hollow fiber membrane, the hollow fiber possesses a substantially circular or elliptical cross-sectional shape. In the embodiments wherein the membrane is a hollow fiber, the discriminating region may occur at or in the vicinity of the outside external surface, at or in the vicinity of the inside internal surface, at some region internal to both the external and internal surfaces, or a combination thereof. In one embodiment, the hollow fiber membrane comprises a discriminating region at or near the internal surface of the hollow fiber membrane and a generally porous region extending from the discriminating region to the external surface of the hollow fiber membrane. In another embodiment, the hollow fiber membrane comprises a generally porous region at or near the external surface of the hollow fiber membrane, a generally porous region at or near the internal surface of the hollow fiber membrane, and a discriminating region generally situated between the two porous surface regions. The discriminating region in the membranes of this invention functions to selectively separate at least one gaseous component from at least one other gaseous component in the feed gas mixture. The discriminating region in such membranes may be a dense region, a region of non-continuous porosity, or a region resembling a closed cell foam.

The generally porous region or regions in the membranes of this invention are capable of passing the feed gas mixture to be separated through such porous region or regions without appreciably inhibiting the transport of the feed gas mixture therethrough, that is, the porous region or regions present minimal resistance to the transport of the feed gas mixture therethrough. Within the porous region or regions, a substantial majority of the pores have a pore size preferably between about 5

Angstroms and about 500 Angstroms, more preferably between about 10 Angstroms and about 300 Angstroms, even more preferably between about 10 Angstroms and about 150 Angstroms. Substantial majority as used herein means that preferably at least about 60 percent, more preferably at least about 75 percent, even more preferably at least about 90 percent, of the pores within the porous region possess a size within the indicated range.

The membranes of this invention are preferably prepared from polycarbonates, polyesters, polyestercarbonates, and combinations thereof. A preferred class of polycarbonates, polyestercarbonates, and polyesters useful in this invention include polymers derived from unsubstituted or substituted bisphenols. Polycarbonates, polyestercarbonates, and polyesters substantially derived from substituted bisphenols are preferred. In such substituted bisphenolic polymers, the substituents may occur on the phenolic rings, on the bridging group, or a combination thereof. Such phenolic and bridging group substituents preferably include $C_{1-6}$ alkyl, $C_{1-4}$ haloalkyl, and $C_{1-4}$ alkoxy monovalent radicals and halogens such as chlorine, bromine, and fluorine. Preferably, a significant portion of the bisphenols used to prepare the polymers are tetra-substituted on the phenolic ring; more preferably, the tetra-substituents are situated in the 3,5-positions on the aromatic or phenolic rings.

Preferably, at least about 25 weight percent of the bisphenol moieties in the polycarbonate, polyestercarbonate, or polyester backbone are tetrahalogenated on the phenolic ring, more preferably at least about 50 weight percent, even more preferably at least about 75 weight percent. Polycarbonates, polyesters, and polyestercarbonates which are especially preferred include those in which about 100 weight percent of the bisphenol moieties are tetrahalogenated on the phenolic rings. Examples of especially preferred polycarbonates in which about 100 weight percent of the bisphenol moieties are tetrahalogenated include 2,2-bis(3,5-bromo-4-hydroxyphenyl)propane and 2,2-bis-(3,5-chloro-4-hydroxyphenyl)propane.

The polycarbonates, polyestercarbonates, and polyester polymers useful in this invention preferably comprise a polymer backbone structure of Formula 1:

wherein
R is independently in each occurrence selected from the group consisting of a direct bond, —CO—, —CO$_2$—, —S—, —SO$_2$—, —SO—, —O—, a $C_{1-12}$ divalent hydrocarbon radical, a $C_{1-12}$ divalent halocarbon radical, and an inertly substituted $C_{1-12}$ divalent hydrocarbon radical;
$R^1$ is independently in each occurrence selected from the group consisting of a $C_{1-18}$ divalent hydrocarbon radical, an inertly substituted $C_{1-18}$ divalent hydrocarbon radical, and a $C_{1-18}$ divalent halocarbon radical;
X is independently in each occurrence selected from the group consisting of hydrogen, a halogen, a $C_{1-6}$ alkyl, a $C_{1-4}$ haloalkyl, and a $C_{1-4}$ alkoxy;

r is a positive real number between 0 and 1 inclusive;
s is a positive real number between 0 and 1 inclusive; and
n is a positive real number, such that the polymer possesses sufficient molecular weight to prepare a membrane with suitable characteristics.

In Formula I, R is independently in each occurrence preferably a direct bond, —CO—, —CO$_2$—, —S—, —SO$_2$—, —SO—, —O—, a $C_{1-8}$ divalent hydrocarbon radical, a $C_{1-8}$ divalent halocarbon radical, and an inertly substituted $C_{1-8}$ divalent hydrocarbon radical; R is independently in each occurrence more preferably a direct bond, a $C_{1-6}$ divalent hydrocarbon radical, a $C_{1-6}$ divalent halocarbon radical, or an inertly substituted divalent hydrocarbon radical; R is independently in each occurrence even more preferably a $C_{1-3}$ divalent hydrocarbon radical, a $C_{1-3}$ divalent halocarbon radical, or an inertly substituted $C_{1-3}$ divalent hydrocarbon radical. Preferred divalent halocarbon radicals include divalent chloro-, bromo-, and fluorocarbon radicals. Inertly substituted as used herein refers to substituents which do not result in undesired reactions or properties in the membranes prepared therefrom. The divalent hydrocarbon radical may be aliphatic, alicyclic, or aromatic.

In Formula I, $R^1$ is independently in each occurrence preferably an unsubstituted or halo-substituted $C_{1-12}$ divalent aliphatic hydrocarbon radical, an unsubstituted or halo-substituted $C_{5-18}$ divalent cycloaliphatic hydrocarbon radical, or an unsubstituted or halo-substituted $C_{6-18}$ divalent aromatic hydrocarbon radical.

In Formula I, X is independently in each occurrence preferably hydrogen, a halogen, a $C_{1-4}$ alkyl, or a $C_{1-4}$ alkoxy; more preferably X is independently in each occurrence hydrogen, chlorine, bromine, fluorine, methyl, ethyl, methoxy, or ethoxy. X is independently in each occurrence even more preferably chlorine, bromine, fluorine, or methyl and most preferably chlorine, bromine, or fluorine.

The ratio of ester to carbonate groups, that is, the value of s/r, in the polyestercarbonate polymers is preferably from about 0.005 to about 200, more preferably from about 0.01 to about 100, even more preferably from about 0.10 to about 90, most preferably from about 0.20 to about 80.

n is preferably a positive real number of at least about 10, more preferably of at least about 25, even more preferably of at least about 50; n is preferably less than about 250, more preferably less than about 200, even more preferably less than about 150.

The polycarbonates, polyestercarbonates, and polyesters useful in this invention generally are commercially available or may be synthesized via conventional polymerization techniques by any process known in the art which prepares polymers with suitable properties for membrane formation. See U.S. Pat. Nos. 2,465,319; 2,999,835; 3,028,364; 3,028,365; 3,030,331; 3,038,874; 3,047,539; 3,119,787; 3,153,008; 3,169,121; 3,207,814;

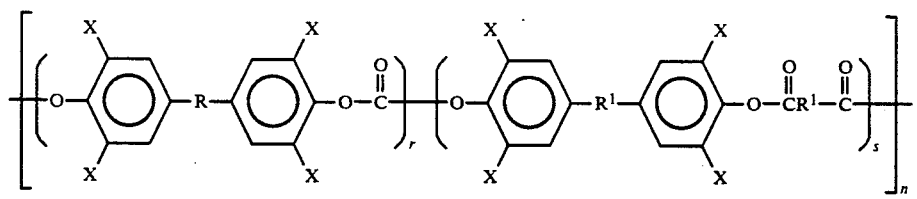

FORMULA I 3,248,366; 3,317,464; 3,334,154; 3,409,704; 3,780,148; 3,824,213; 3,829,266; 3,912,687; 3,948,856; 4,137,128; 4,156,069; 4,194,038; 4,255,556; 4,310,652; 4,311,822; and 4,413,103; the relevant portions relating to polymer synthesis incorporated herein by reference. See also *Kirk-Othmer Encyclopedia of Chemical Technology*, 3rd edition, Vol. 18, John Wiley & Sons, New York, N.Y., 1982, pp. 479–494 and 531–593 and *Encyclopedia of Polymer Science & Technology*, Vol. 10, John Wiley & Sons, New York, N.Y., 1969, pp. 714–725, the relevant portions relating to polymer synthesis incorporated herein by reference.

The polycarbonates, polyestercarbonates, and polyesters useful in this invention should be polymerized to the extent that the polymers will form a membrane with sufficient mechanical strength for intended operating conditions. Preferably, the polycarbonates, polyestercarbonates, and polyesters have a number-average molecular weight of at least about 2,000 and a number-average molecular weight of less than about 75,000. Such polymers preferably possess an inherent viscosity in methylene chloride of at least about 0.30 dL/gram and an inherent viscosity in methylene chloride of less than about 1.35 dL/gram.

The solvent used to prepare the membranes of this invention may be any solvent or mixture of solvents for the polymer which dissolves enough of the polymer so as to form a solution viscous enough to be extrudable or castable at the membrane fabrication temperature. The amount of solvent used depends upon the polymer used, the optional non-solvent used, the desired properties of the membrane, and the method of quenching and/or leaching the membrane. A solvent dissolves at least about 5 weight percent of the polymer at the extrusion or casting temperature. Preferably the solvent dissolves at least about 10 weight percent of the polymer at the extrusion or casting temperature, more preferably at least about 25 weight percent of the polymer at the extrusion or casting temperature.

The following solvents are generally preferred for use in this invention. The glycol ethers preferred as solvents include those glycol ethers corresponding to the formula $R^3O—(CH_2CH_2O)_d—R^3$ wherein $R^3$ is methyl or ethyl, and d is an integer of between about 1 and about 20. Preferably d is an integer of between about 1 and about 10, more preferably between about 1 and about 4, even more preferably when $R^3$ is methyl d is between about 1 and about 4 and when $R^3$ is ethyl d is between 2 and about 4. Examples of such glycol ethers include ethylene glycol dimethyl ether, diethylene glycol dimethyl ether, and bis(2-methoxyethylether). Dialkyl ketones preferred as solvents include dimethyl ketone, diethyl ketone, and methyl ethyl ketone. Substituted morpholines preferred as solvents include those morpholines with a $C_{1-10}$ alkyl, formyl, or $C_{1-10}$ alkanoyl moiety substituted on the nitrogen atom, more preferred are substituted morpholines with a $C_{1-4}$ alkyl, formyl, or $C_{1-4}$ alkanoyl moiety substituted on the nitrogen atom. Examples of such substituted morpholines include N-formylmorpholine and N-ethylmorpholine. Preferred pyrrolidinones useful as solvents include pyrrolidinone, N-methyl-2-pyrrolidinone, N-ethyl-2-pyrrolidinone, N-cyclohexyl-2-pyrrolidinone, N-benzyl-2-pyrrolidinone, and N-phenyl-2-pyrrolidinone, with N-methyl-2-pyrrolidinone and N-ethyl-2-pyrrolidinone being more preferred, and N-methyl-2-pyrrolidinone being even more preferred. The term pyrrolidinone as used herein refers to compounds named as pyrrolidinones and pyrrolidones. Preferred substituted benzenes useful as solvents include those benzenes corresponding to the formula:

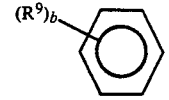

wherein $R^9$ is $C_{1-4}$ alkoxycarbonyl, nitro, halo, or a formyl moiety; and b is an integer of about 1 to about 6, with the proviso that wherein $R^9$ is alkoxycarbonyl, b is 1. The preferred halogens are chlorine and bromine, with chlorine more preferred. Preferably b is between about 1 and about 3. Examples of substituted benzenes preferred as solvents include chlorobenzene, dichlorobenzene, benzaldehyde, nitrobenzene, ethyl benzoate, methyl benzoate, and 1,2,4-trichlorobenzene.

More preferred solvents comprise N-methyl-2-pyrrolidinone, tetrahydrofuran, ethylene glycol dimethylether, diethylketone, N-ethylmorpholine, dimethylformamide, cyclohexanone, bis(2-methoxyethylether), N,N-dimethylacetamide, acetophenone, methylene chloride, sulfolane, or mixtures thereof; even more preferred solvents comprise N-methyl-2-pyrrolidinone, ethylene glycol dimethylether, tetrahydrofuran, diethylene glycol dimethylether, acetophenone, methylene chloride, cyclohexanone, or mixtures thereof; a most preferred solvent is N-methyl-2-pyrrolidinone. See also U.S. Pat. No. 4,962,131, the relevant portions incorporated herein by reference.

The optional non-solvent useful for preparing the membranes of this invention may be any compound or mixture of compounds which does not substantially dissolve at the extrusion or casting temperature of the polymer, which is soluble in the solvent, and which aids in the formation of pores in the polymer rich phase when the mixture is passed into a quench zone. Preferably the non-solvent dissolves less than about 5 weight percent of the polymer present at the membrane fabrication temperature. The amount of non-solvent used depends upon the polymer used, the solvent used, the desired properties of the membrane, and the method of quenching and/or leaching the membrane.

The following non-solvents are preferred for use in the invention. The glycols and glycol ethers useful as non-solvents include those glycols and glycol ethers corresponding to the formula $R^4O—(CH_2CH_2O)_q-R^4$ wherein $R^4$ is independently in each occurrence hydrogen or $C_{1-4}$ alkyl, and q is an integer of about 1 to about 250. Preferably $R^4$ is hydrogen. Preferably q is an integer of about 2 to about 100, more preferably of about 3 to about 60, and even more preferably of about 3 to about 15. Examples of preferred glycols and glycol ethers include 2-ethoxyethanol, polyethylene glycols with molecular weights of up to about 1450, triethylene glycol, diethylene glycol, and diethylene glycol dibutylether. Esters useful as non-solvents include those esters corresponding to the formula $R^5COOR^6$ wherein $R^5$ is hydrogen or $C_{1-19}$ alkyl, and $R^6$ is $C_{1-10}$ alkyl. Preferably $R^5$ is hydrogen or $C_{1-4}$ alkyl, and $R^6$ is $C_{1-4}$ alkyl. Even more preferably, $R^6$ is ethyl or methyl. Examples of preferred esters include methyl formate, ethyl formate, methyl acetate, n-octyl acetate, methyl laurate, methyl myristate, butyl stearate, and methyl stearate. Preferred alkanols useful as non-solvents include methanol, ethanol, 2-propanol, and 1-hexanol.

Preferred cyclohexanes useful as non-solvents include those which are unsubstituted or substituted with a $C_{1-10}$ alkyl, $C_{3-10}$ cycloalkyl, or $C_{1-4}$ perfluoroalkyl moiety. More preferred cyclohexanes useful as non-solvents include those which are unsubstituted of substituted with a $C_{1-4}$ alkyl, $C_{5-6}$ cycloalkyl, or trifluoromethyl moiety. Examples of such cyclohexanes include cyclohexane, methylcyclohexane, isopropylcyclohexane, t-butyl-cyclohexane, and dicyclohexyl. Preferred $C_{5-20}$ alkanes useful as non-solvents include hexane, dodecane, and hexadecane. Preferred dialkyl ketones useful as non-solvents include those ketones wherein one of the alkyl moieties is $C_{3-10}$ and the other is $C_{1-10}$. Examples of preferred dialkyl ketones useful for non-solvents include methyl isobutyl ketone and diisopropyl ketone. Preferred amides useful as non-solvents include those amides corresponding to the formula $R^7CONHR^8$ wherein $R^7$ is preferably hydrogen or $C_{1-3}$ alkyl, and $R^8$ is preferably $C_{1-4}$ alkyl. Examples of preferred amides include N-methyl formamide and N-methyl acetamide. Preferred nitriles for use as non-solvents include acetyl and $C_{1-3}$ alkyl nitriles. Examples of preferred nitriles include acetonitrile and propionitrile. Preferred aldehydes include $C_{1-4}$ alkyl aldehydes, with butylaldehyde even more preferred. Preferred substituted benzenes include formyl, alkyl, and cycloalkyl substituted benzenes corresponding to the formula:

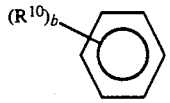

wherein $R^{10}$ is $C_{1-10}$ alkyl, $C_{3-10}$ cycloalkyl, or formyl, and b is as defined hereinbefore. Preferably $R^{10}$ is $C_{1-10}$ alkyl, $C_{5-6}$ cycloalkyl, or formyl.

Preferred non-solvents comprise triethylene glycol, 2-ethoxyethanol, diethylene glycol dibutyl ether, polyethylene glycols with molecular weights of up to about 1450, diethylene glycol, dodecane, hexadecane, cyclohexane, methylcyclohexane, perchloroethylene, diisopropylketone, isopropylketone, isopropylcyclohexane, t-butylcyclo-hexane, N-methylformamide, decyclene, N-methylacetamide, tetralin, dicyclohexyl, cyclohexyl benzene, diethylene glycol dibutylether, carbon tetrachloride, water, or mixtures thereof. More preferred non-solvents comprise water, diisopropylketone, tetraethylene glycol dimethylether, diethylene glycol dibutyl ether, hexadecane, diethylene glycol, triethylene glycol polyethylene glycol with molecular weights of up to about 1450, 2-ethoxyethanol, carbon tetrachloride, dodecane, or mixtures thereof. Even more preferred non-solvents are triethylene glycol and polyethylene glycols with molecular weights of up to about 400.

Certain solvents and non-solvents may cause degradation of the polymer if the polymer, solvent, and optional non-solvent mixture is maintained at elevated temperatures for extended periods of time. The solvent and optional non-solvent should be chosen to minimize degradation of the polymer at the extrusion temperatures. The solvent and optional non-solvent should be compatible, that is, mutually soluble to an effective extent; in particular the non-solvent should be at least partially soluble in the solvent, and the optional non-solvent must be capable of forming pores in the quenched polymer in the presence of the solvent.

Skilled artisans often describe the solvent and non-solvent as a solvent and non-solvent pair. Generally preferred solvent and non-solvent pairs include N-methyl-2-pyrrolidinone and triethylene glycol, N-methyl-2-pyrrolidinone and a polyethylene glycol with a molecular weight of up to about 1450, ethylene glycol dimethylether and water, tetrahydrofuran and water, ethylene glycol dimethylether and diisopropylketone, tetrahydrofuran and diisopropylketone, diethylene glycol dimethylether and water, diethylene glycol dimethylether and tetralin, tetraethylene glycol dimethylether and N-methyl-acetamide, acetophenone and diethylene glycol dibutylether, methylene chloride and carbon tetrachloride, cyclohexanone and dodecane, and acetophenone and hexadecane. More preferred solvent and non-solvent pairs include N-methyl-2-pyrrolidinone and triethylene glycol, cyclohexanone and dodecane, N-methyl-2-pyrrolidinone and a polyethylene glycol with a molecular weight of up to about 400, and acetophenone and hexadecane. Even more preferred solvent and non-solvent pairs include N-methyl-2-pyrrolidinone and triethylene glycol, and N-methyl-2-pyrrolidinone and a polyethylene glycol with a molecular weight of up to about 400.

Some compounds may be both a solvent and a non-solvent, wherein their function is dictated by the polymer and the temperature at which the membrane is formed.

In some embodiments, a solubilizing agent is used to aid in preparing a substantially homogeneous polymer, solvent, and optional non-solvent mixture. The solubilizing agent may be any solvent which aids in preparing such a substantially homogeneous mixture. The solubilizing agent is preferably a solvent which possesses a boiling point lower than the membrane fabrication temperature and the boiling points of the solvent and optional non-solvent. The mixture may be formed at temperatures below the fabrication temperature. The solubilizing agent aids in forming a substantially homogeneous mixture at such temperatures. Preferably the solubilizing agent evaporates, flashes off, or is otherwise removed, prior to or during fabrication. Preferred solubilizing agents depend upon the particular polymer and generally include halogenated hydrocarbons, cyclic and non-cyclic ethers, and alkyl ketones. More preferred solubilizing agents generally include methylene chloride, tetrahydrofuran, methyl ethyl ketone, methyl iodide, and chloroform. An even more preferred solubilizing agent is methylene chloride.

The solubilizing agent is generally not needed in embodiments wherein the mixture is mixed at elevated temperatures under high shear or with good mixing, wherein the mixture is to be extruded or cast shortly after formation of the substantially homogeneous mixture.

The polymer, solvent, and optional non-solvent mixture comprises appropriate amounts of the polymer, solvent, and optional non-solvent to be extruded or cast into the membranes of this invention at the membrane fabrication temperature. In particular, the mixture should possess an acceptable viscosity for such extrusion or casting at the membrane fabrication temperature. The upper limit on the viscosity is that viscosity at which the mixture is too viscous to extrude or cast. The lower limit on the viscosity is that viscosity at which the mixture loses its physical integrity after leaving the vicinity of the extrusion die or spinnerette or is not able to be cast. For casting, preferably the viscosity of the mixture at the casting temperature is between about 20 poise and about 200 poise. For extrusion, preferably the viscosity of the mixture at the extrusion temperature is between about $1 \times 10^3$ poise and about $1 \times 10^7$ poise.

Such a mixture is preferably substantially homogeneous at the membrane fabrication temperature. It is preferable that at the fabrication temperature, the mixture is close to the phase boundary between a one-phase mixture and a two-phase mixture. Therefore, the concentrations of the components in the mixture should be chosen such that the mixture is near the phase boundary at the fabrication temperature. Furthermore, if the polymer concentration is too high, the discriminating region will be too thick and the pores will be too small, thus reducing the gas flux through the formed membrane. If the polymer concentration is too low, the pores will be too large and the gas selectivity too low. Preferably, for casting, the mixture comprises between about 5 to about 30 percent by weight of the polymer and about 95 to about 70 percent by weight of the combined solvent and optional non-solvent. Preferably, for extrusion, the mixture comprises between about 30 to about 65 percent by weight of the polymer and about 35 to about 70 percent by weight of the combined solvent and optional non-solvent. More preferably, for extrusion, the mixture comprises between about 35 to 60 percent by weight of the polymer and about 40 to about 65 percent by weight of the combined solvent and optional non-solvent. Even more preferably, for extrusion, the mixture comprises between about 40 to about 55 percent by weight of the polymer and about 45 to about 60 percent by weight of the combined solvent and optional non-solvent. For casting, the mixture generally comprises somewhat less polymer by weight than used for extrusion.

The ratio of the solvent to the non-solvent is dependent upon the polymer, the solvent and the non-solvent used, the relative solubilities with respect to one another, and the amount of water present in the mixture. The solvent/non-solvent ratio is preferably chosen such that the mixture is near the phase boundary at the membrane fabrication temperature. The solvent and non-solvent preferably are present in a ratio of between about 0.5 to about 10, more preferably between about 1.0 to about 5.0, and even more preferably between about 2.0 to about 2.5.

The presence of water in the mixture may have a significant effect on the phase separation properties of the mixture. The amount of water in the mixture can therefore be used to partially control the phase separation properties of the mixture. The maximum allowable amount of water in the mixture depends upon the polymer and the composition of the mixture. The mixture preferably contains less than about 1 weight percent water, more preferably less than about 5000 ppm water, even more preferably less than about 3500 ppm water, most preferably less than about 2000 ppm water.

The components of the mixture may be combined prior to casting or extrusion by mixing in any convenient manner with conventional mixing equipment, as for example, in a Hobart brand mixer or a resin kettle, or using static mixers. Alternatively, the mixture may be homogenized by extruding the mixture through a twin screw extruder, cooling the extrudate, and grinding or pelletizing the extrudate to a particle size readily fed to a single or twin screw extruder. The components of the mixture may also be combined directly in a melt-pot or twin screw extruder and extruded into membranes in a single step.

For casting, the mixture is heated to a temperature at which the mixture preferably forms a substantially homogeneous fluid and possesses sufficient viscosity at casting temperatures to permit casting of a membrane. A membrane may be cast into flat sheet form by pouring the fluid mixture onto a smooth support surface and drawing down the fluid mixture to an appropriate thickness with a suitable tool such as a doctor blade or casting bar. Alternatively, the mixture may be cast in a continuous process by casting the fluid mixture onto endless belts or rotating drums. The casting surface may be such that the membrane may thereafter be readily separated from the surface. For example, the membrane may be cast onto a support having a low surface energy such as silicone, coated glass, Teflon, or coated metal, or a surface to which the membrane will not adhere. The cast membrane is thereafter subsequently quenched and leached as described hereinafter for membranes formed by the extrusion process.

For extrusion, the mixture is heated to a temperature at which the mixture preferably forms a substantially homogeneous fluid and possesses sufficient viscosity at extrusion temperatures to permit extrusion of a membrane. Substantially homogeneous fluid as used herein refers to a fluid in which the various components are substantially uniformly distributed. The upper limit on the pre-extrusion temperature is that temperature at which the polymer undergoes detrimental degradation in the presence of the particular solvent and non-solvent. Detrimental degradation means herein that the polymer degrades sufficiently such that the viscosity of the mixture is significantly lowered below that viscosity at which an acceptable membrane can be formed. In the case of hollow fiber membranes, this is generally indicated by the point at which the hollow fiber membrane collapses in the gaseous quench zone. Pre-extrusion temperatures are dependent upon the polymer, the solvent, and optional non-solvent used, and the concentrations of the components in the mixture. Preferably upper pre-extrusion temperatures are about 280° C. or below, more preferably about 230° C. or below, even more preferably about 200° C. or below. This upper pre-extrusion temperature limit is significantly affected by the type of extrusion apparatus that is used. Generally, a tradeoff exists between the temperature limit and the residence time in the heating zone. With lower residence times, the mixture can be heated to higher temperatures. The lower limit on the pre-extrusion temperature is that temperature at which the viscosity of the mixture is sufficiently low enough to allow extrusion. Preferably lower pre-extrusion temperatures are about 50° C. or above, more preferably about 70° C. or above, even more preferably about 90° C. or above.

The heated mixture which forms a substantially homogeneous fluid is extruded through a film or sheet die or a hollow fiber die or spinnerette. Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid preferably is a gas such as nitrogen, argon, air, carbon dioxide, or other inert gas. The core fluid pressure may be any pressure which prevents the hollow fiber membrane from collapsing and which does not deleteriously affect the properties of the hollow fiber membrane. The core fluid pressure is preferably between about 0.1 and 0.5 inches of water (2.54 and 12.70 kg/m$^2$), more preferably 0.25 and 0.4 inches of water (6.35 and 10.16 kg/m$^2$).

Following extrusion, the membrane is passed through at least one gaseous quench zone under conditions such that the mixture cools and begins to phase separate. The temperature and residence time in the gaseous quench zone should be sufficient such that the mixture begins to phase separate but does not undergo complete phase separation in said zone, while the membrane may optionally undergo significant draw down within the gaseous quench zone. The upper limit on the temperature of the gaseous quench zone is that temperature below which the mixture possesses sufficient viscosity to retain its shape and integrity. Preferably upper temperatures are about 120° C. or below, more preferably about 90° C. or below, even more preferably about 40° C. or below. The lower temperature of the gaseous quench zone is that temperature above which the mixture undergoes substantially complete phase separation while in the gaseous quench zone. Preferably lower temperatures are about 0° C. or above, more preferably about 10° C. or above, even more preferably about 20° C. or above. As noted hereinbefore, the temperatures and the residence time are interdependent variables; at lower temperatures the residence time is shorter, while at higher temperatures the residence time is longer, so as to achieve the desired results within the gaseous quench zone. Preferably the upper limit on the residence time in the gaseous quench zone is about 10 seconds or less, more preferably about 6 seconds or less, even more preferably about 1 second or less. The lower limit on residence time is preferably about 0.05 seconds or greater, more preferably about 0.1 seconds or greater, even more preferably about 0.25 seconds or greater. Preferably the relative humidity within the gaseous quench zone at about 24° C. is between about 20 percent to about 80 percent, more preferably between about 30 percent and about 70 percent, even more preferably between about 50 percent and about 70 percent. Shrouds with cooling and flow control may be used to help adjust the gas flowrate, temperature, and humidity in the gaseous quench zone.

Within the gaseous quench zone, the membrane is optionally drawn down or elongated to the appropriate size and thickness. Drawing down or elongating means the membranes are stretched such that the cross sectional area of the membrane is smaller at the end of the drawing or elongation process. Preferably the lower limit on the draw down or elongation ratio is about 1.0, more preferably about 1.5. Preferably the upper limit on the draw down or elongation ratio is about 15, more preferably about 10. The membrane may be drawn down in one or more stages with the option of using different draw rates and draw ratios in each stage. Line speeds are generally not critical and may vary significantly. Practical minimum preferred line speeds are at least about 10 feet/minute (3.05 meters/minute), more preferably at least about 30 feet/minute (9.14 meters/minute), even more preferably at least about 100 feet/minute (30.48 meters/minute). Practical maximum preferred line speeds are less than about 1000 feet/minute (304.8 meters/minute), more preferably less than about 500 feet/minute (152.4 meters/minute).

Following the gaseous quench zone, the membrane is passed into at least one liquid quench zone and optionally at least one liquid leach zone. Within the liquid quench and/or leach zone, the membrane substantially completes phase separation and a substantial portion of the solvent and optional non-solvent is removed. The liquid quench comprises any liquid which dissolves both the solvent and optional non-solvent and which does not appreciably dissolve the polymer or deleteriously affect the separation or mechanical properties of the formed membrane. The liquid quench and/or leach media is selected such that the polymer has a low solubility in the liquid media; the solubility of the polymer in the liquid media is about 5.0 percent by weight or lower, more preferably about 3.0 percent by weight or lower, even more preferably about 1.0 percent by weight or lower, most preferably about 0.5 percent by weight or lower. Examples of preferred liquid quench or leach media include lower alcohols, water, fluorocarbons, lower aliphatic hydrocarbons, and mixtures thereof. Water is a suitably convenient liquid quench and/or leach media.

Optionally, after leaving the first liquid quench zone, the membrane may be passed through or contacted with other liquid quench and/or leach zones. The conditions of each liquid quench or leach zone is dependent upon the number of zones used and the conditions of the other zones. The conditions of the first liquid quench zone depend upon whether other liquid quench or leach zones are used. If only one liquid quench and/or leach zone is used, the conditions should be such that the membrane substantially completes phase separation and a substantial portion of the solvent and optional non-solvent is removed.

In the embodiment wherein only one combined liquid quench and/or leach zone is used, the upper temperature limit on the liquid quench zone is that temperature such that a substantial portion of the solvent and optional non-solvent is removed from the membrane while the membrane substantially completes phase separation within the liquid quench zone. Preferred upper temperatures are about 120° C. or below, more preferred are about 90° C. or below, even more preferred are about 50° C. or below, most preferred are about 30° C. or below. The lower temperature limit is that temperature at which the liquid quench zone freezes. Preferred lower temperatures are about 0° C. or above, more preferred are about 10° C. or above, even more preferred are about 20° C. or above. Operating at ambient temperature is generally sufficient and convenient. The residence time in the liquid quench zone should be sufficient to allow substantial completion of the phase separation of the membrane and to allow removal of a substantial portion of the solvent and optional non-solvent. The residence time in the liquid quench zone may be as long as the economics of the process permit, provided that no deleterious effects result from such residence times, such as, for example, damage to the membrane due to bacterial growth. Low levels of sterilizing agents such as bleach may be added to the storage liquid to prevent or inhibit bacterial growth. Residence times of up to several days may be used. Preferably the upper limit on the residence time is about 240 minutes or lower, more preferably about 120 minutes or lower, even more preferably about 60 minutes or lower, most preferably about 30 minutes or lower. Preferably, the lower residence time is about 0.5 minutes or longer, more preferably about 1 minute or longer, even more preferably about 2 minutes or longer, most preferably about 5 minutes or longer.

In a preferred embodiment, at least one liquid quench zone and at least one liquid leach zone are used. In this embodiment, the liquid quench zone temperature and residence time should be sufficient to result in at least partial phase separation of the membrane within said liquid quench zone, and to allow at least a portion of the solvent and optional non-solvent to be removed from the membrane. The lower temperature limit of the liquid quench zone is that temperature at which the liquid quench media freezes. Generally, lower liquid quench zone temperatures are preferred. The preferred lower temperature is about 0° C. or greater. Preferably, the upper temperature is about 30° C. or less, more preferably about 20° C. or less, even more preferably about 10° C. or less, most preferably about 6° C. or less. The lower limit on the residence time is preferably about 0.05 seconds or greater, more preferably about 0.1 seconds or greater, even more preferably about 0.5 seconds or greater, most preferably about 1 second or greater. The upper residence time is preferably about 600 seconds or less, more preferably about 300 seconds or less, even more preferably about 30 seconds or less, and most preferably about 20 seconds or less. The liquid leach zone functions to remove substantially all of the remaining solvent and optional non-solvent. The conditions of the liquid leach zone should be such that substantially all of the remaining solvent and optional non-solvent are removed in the liquid leach zone and such that phase separation of the membrane is substantially completed. The temperature of the liquid leach zone is that temperature which facilitates the removal of the remaining solvent and optional non-solvent from the membrane. The lower limit on temperature is that temperature below which the solvent and optional non-solvent are no longer removed from the membrane at an acceptable rate. Preferred lower temperatures are about 50° C. or above, more preferred are about 70° C. or above, even more preferred are about 80° C. or above. The upper temperature limit on the liquid leach zone is that temperature at which either the liquid leach media boils or the membrane properties are deleteriously affected. Preferred upper temperatures are about 120° C. or below, more preferred are about 100° C. or below, even more preferred are about 90° C. or below. Generally, as the temperature is lowered, the residence time required to achieve the same removal of solvent and optional non-solvent becomes longer. The residence time in the liquid leach zone should be sufficient to allow substantial completion of the phase separation of the membrane and to allow removal of a substantial portion of the remaining solvent and optional non-solvent at the leach zone temperature. The residence time in the liquid leach zone may be as long as the economics of the process permit, provided that no deleterious affects result from such residence times, such as, for example, damage to the membrane due to bacterial growth. Low levels of sterilizing agents such as bleach may be added to the storage liquid to prevent or inhibit bacterial growth. Residence times of up to several days may be used. Preferably the upper limit on the residence time is about 240 minutes or lower, more preferably about 120 minutes or lower, even more preferably about 60 minutes or lower. Preferably, the lower residence time is about 0.5 minutes or longer, more preferably about 1 minute or longer, even more preferably about 2 minutes or longer, most preferably about 5 minutes or longer.

The membranes are treated by contacting the membrane with a solution containing a non-ionic surfactant. The non-ionic surfactants useful in this invention preferably have an HLB, or hydrophile-lipophile balance, value of between about 8.0 and about 17.0, more preferably between 8.25 and about 16.0, even more preferably between about 8.5 and about 15.0. The HLB values of non-ionic surfactants are generally available from the manufacturer and/or are compiled in handbooks such as *McCutcheon's Emulsifiers And Detergents*, North American Edition, McCutcheon Division, MC Publishing Co., New Jersey, 1984, the relevant portions incorporated herein by reference. HLB values may be based on experimental emulsification data or calculated from the structure of the surfactant molecule. See Rosen, *Surfactants And Interfacial Phenomena*, 2nd Edition, John Wiley and Sons, New York, New York, 1989, Griffin, "Calculation of HLB Values of Non-Ionic Surfactants," *Journal of The Society of Cosmetic Chemists*, 1954, pp. 249–256; and Griffin, "Classification of Surface-Active Agents by 'HLB'," *Journal of The Society of Cosmetic Chemists*, 1949, pp. 311–326; the relevant portions incorporated herein by reference. The non-ionic surfactants preferably have a molecular weight of between about 200 and about 10,000, more preferably of between about 350 and about 3,000. The non-ionic surfactants useful in this invention preferably include polyoxyethylenated alkyl phenols (alkylphenol ethoxylates), polyoxyethylenated straight chain alcohols (alcohol ethoxylates), polyoxyethylenated polyoxypropylene glycols, alkyl poly(ethylene glycol) ethers, and fluorinated non-ionic surfactants, more preferably alkylphenol ethoxylates and fluorinated non-ionic surfactants. Preferred alkyl phenol ethoxylate non-ionic surfactants include p-nonylphenol, p-octylphenol, and p-dodecylphenol. Examples of preferred non-ionic surfactants include TERGITOL NP 4, 6, 7, and 10 nonylphenol polyethylene glycol ether non-ionic surfactants, available from Union Carbide, ZONYL FSO-100 fluorochemical surfactant, available from duPont, and TRITON X-100 and X-102 octylphenoxy ethoxyethanol (ethoxylated alkyl phenol) non-ionic surfactants, available from Union Carbide.

The solution containing surfactant may comprise a liquid in which the surfactant at least partially dissolves and which does not deleteriously affect the physical integrity of the membrane. The liquid containing the surfactant is preferably one which does not swell the membrane. Preferred liquids include water. The solution contains an amount of surfactant effective to impart the desired recovery and selectivity in the treated membrane. The solution preferably contains non-ionic surfactant in an amount between about 1 ppm and about 2000 ppm, more preferably between about 5 ppm and about 1000 ppm, even more preferably between about 5 ppm and about 500 ppm. The temperature at which the membrane is contacted is that temperature which does not deleteriously affect the membrane, preferably between about 5° C. and 50° C., even more preferably between about 15° C. and 30° C. Ambient temperatures are generally convenient and sufficient. The membrane is contacted with the non-ionic surfactant for a period of time sufficient to deposit an amount of the non-ionic surfactant sufficient to impart improved gas selectivity and recovery characteristics in the treated membrane compared to the untreated membrane. Preferably the contact time is between about 1 minute and about 2 hours, more preferably between about 30 minutes and about 1 hour. Generally, as the contact time is increased, the concentration of non-ionic surfactant in the solution may be decreased while still achieving comparable results. The non-ionic surfactant may be disposed upon the surface of the membrane as a substantially uniform layer or coating, or as a residue of closely spaced discrete particles or agglomerations. The non-ionic surfactant preferably does not substantially intrude into the porous regions of the membrane. In the embodiment wherein hollow fiber membranes are used, the membranes may be contacted with the non-ionic surfactant solution by contacting the shellside of the membrane, the tubeside of the membrane, or a combination thereof, with the solution.

Following contacting with the non-ionic surfactant solution, the membrane is preferably contacted with a rinsing agent to remove excess surfactant. The rinsing agent may be any liquid which removes excess surfactant and which does not deleteriously affect the physical integrity of the membrane. Water is a convenient and sufficient rinsing agent. The temperature at which the membrane is rinsed is that which does not deleteriously affect the physical integrity of the membrane, preferably between about 5° C. and about 50° C. Ambient temperatures are generally convenient and sufficient.

The presence of the non-ionic surfactant on the membrane surface may be detected by known analytical surface chemistry techniques such as Secondary Ion Mass Spectrometry (SIMS) or measurement of fluorescence.

The membrane is preferably dried, either before or after fabrication into a membrane device. The membrane may be dried by exposing it to air or another inert gas such as nitrogen, argon, or carbon dioxide which is sufficiently dry to aid in the removal of liquids from the membrane. Such exposure takes place at a temperature which does not deleteriously affect the separation or mechanical properties of the membrane and at which drying occurs at a reasonable rate, preferably between about 0° C. and about 100° C., more preferably between about 5° C. and about 90° C., even more preferably between about 10° C. and about 80° C. Such exposure may include a gentle flow of gas on the outside of the membrane either substantially perpendicular to the longitudinal direction of the membrane or along the longitudinal direction of the membrane. The drying gas may also be passed down the bore of a hollow fiber membrane. The membrane may also be dried under vacuum.

Film membranes of this invention preferably possess a thickness of between about 1 micron and about 500 microns, more preferably of between about 5 microns and about 100 microns, even more preferably between about 5 microns and about 50 microns. Hollow fiber membranes of this invention preferably possess an outside diameter of between about 50 microns and about 500 microns, more preferably between about 100 microns and about 250 microns. The wall thickness of such hollow fiber membranes is preferably between about 5 microns and about 100 microns, more preferably between about 10 microns and about 50 microns. The membranes of this invention preferably exhibit transport properties similar to a dense membrane with an effective thickness of about 5 microns or less, more preferably of about 1.5 microns or less, even more preferably of about 0.5 microns or less, most preferably of about 0.1 microns or less. Effective thickness as used herein means that the asymmetric membrane functions as if it is a homogeneous (dense) flat membrane of such thickness.

The membranes are fabricated into flat sheet, plate and frame, spiral wound, hollow fiber, or tubular membrane devices by methods known in the art. Hollow fiber membrane devices and spiral wound membrane devices are generally preferred. The membrane is generally sealingly mounted in a vessel or case in such a manner that the membrane separates the vessel into two fluid regions wherein fluid flow between the two regions is accomplished by fluid permeating through the membrane. The membrane separates a higher pressure region into which the feed gas mixture is introduced from a lower pressure region. One side of the membrane is contacted with the feed gas mixture under pressure, while a pressure differential is maintained across the membrane. At least one gaseous component in the feed gas mixture selectively passes through the membrane more rapidly than at least one other gaseous component in the feed gas mixture. Gas which is enriched in at least one gaseous component is thus obtained in the lower pressure region as permeate. Gas depleted in at least one gaseous component is obtained in the higher pressure region which is removed as non-permeate. As used herein, semi-permeable membrane refers to a membrane which displays different gas permeabilities for different species of molecules, and therefore may be used in the separation of molecules having different permeabilities across the membrane. Permeate as used herein refers to those species which permeate through the membrane at a faster rate than other species. Non-permeate as used herein refers to those species which permeate at a slower rate than the other species present. In the case of hollow fiber membranes, the feed gas may be introduced either on the outside of the hollow fiber membrane, that is, on the shellside of the membrane device, or on the inside of the hollow fiber membrane or bore, that is, on the tubeside of the membrane device. Preferably, the feed gas mixture is introduced on the inside of the hollow fiber membrane such that the higher pressure region is on the inside of the hollow fiber membrane and the lower pressure region is on the outside of the hollow fiber membrane.

This invention is a process for separating at least one gaseous component from at least one other gaseous component in a gas mixture containing gases such as hydrogen, helium, oxygen, nitrogen, carbon monoxide, carbon dioxide, ammonia, hydrogen sulfide, water vapor, and light hydrocarbons. As used herein, the term light hydrocarbons refers to gaseous saturated and unsaturated $C_{1-4}$ hydrocarbons. The process is carried out at pressures and temperatures which do not deleteriously affect the membranes. Preferably, the pressure on the higher pressure side of the membrane is between about 35 psig (about 241 kPa) and about 2000 psig (about 13,790 kPa), more preferably between about 100 psig (about 689 kPa) and about 1000 psig (about 6895 kPa), even more preferably between about 100 psig (about 689 kPa) and about 500 psig (about 3,447 kPa). The pressure differential across the membrane is preferably between about 15 psig (about 103 kPa) and about 1500 psig (about 10,342 kPa), more preferably between about 50 psig (about 345 kPa) and about 500 psig (about 3,447 kPa). The temperature at which the feed gas mixture is contacted with the membrane is preferably between about 0° and 150° C., more preferably between about 5° C. and 100° C.

Gas permeability is defined as $$P = \frac{(\text{amount of permeant})(\text{membrane thickness})}{(\text{area})(\text{time})(\text{driving force across the membrane})}$$

A standard permeability measurement unit is the Barrer (Ba), which is equal to $$10^{-10} \frac{(\text{centimeter})^3 (\text{STP}) (\text{centimeter})}{(\text{centimeter})^2 (\text{second}) (\text{centimeter Hg})},$$

abbreviated hereinafter as $$10^{-10} \frac{\text{cm}^3 (\text{STP}) \text{ cm}}{\text{cm}^2 \text{s cmHg}}.$$

The reduced gas flux is defined as (permeability)÷(membrane thickness). A standard reduced flux unit is $$10^{-6} \frac{(\text{centimeter})^3 (\text{STP})}{(\text{centimeter})^2 (\text{second}) (\text{centimeter Hg})},$$

abbreviated hereinafter as $$10^{-6} \frac{\text{cm}^3 (\text{STP})}{\text{cm}^2 \text{s cmHg}}.$$

Alpha, the gas separation factor or gas selectivity, is defined as the ratio of the permeability or flux of the faster permeating gas to the permeability or flux of the slower permeating gas.

The treated membranes of this invention possess improved gas selectivity and recovery properties compared with untreated membranes. The treated membranes of this invention preferably possess a selectivity for oxygen/nitrogen at 25° C. of at least about 5 percent greater, more preferably of at least about 10 percent greater, than untreated membranes. The treated membranes of this invention preferably possess a recovery based on air as the feed gas at 25° C. and 1.0 percent oxygen in the non-permeate of at least about 5 percent greater than the untreated membranes. The membranes of this invention preferably are characterized by a separation factor for oxygen/nitrogen at about 25° C. of at least about 7.0, more preferably of at least about 7.5. The membranes of this invention preferably are characterized by a reduced gas flux for oxygen of at least about $6 \times 10^{-6}$ cm$^3$(STP)/(cm$^2$s cmHg), more preferably of at least about $10 \times 10^{-6}$ cm$^3$(STP)/(cm$^2$s cmHg). The membranes of this invention preferably are characterized by a recovery based on air as the feed gas at 1.0 percent oxygen concentration in the non-permeate of at least about 38 percent at about 25° C., more preferably of at least about 40 percent at about 25° C., even more preferably of at least about 42 percent at about 25° C.

The membranes of this invention may be operated in parallel or in series and/or combined with non-membrane separation processes such as cryogenics, that is, low temperature distillation, and pressure swing adsorption.

SPECIFIC EMBODIMENTS

The following examples are for purposes of illustration only and are not intended to limit the scope of the invention or claims.

EXAMPLES 1-19

The following general procedure was used for Examples 1-19. Hollow fiber membranes were extruded from a blend containing by weight about 50 percent tetrabromobisphenol A polycarbonate, 33 percent N-methyl-2-pyrrolidinone, and 17 percent triethylene glycol at about 75° C., quenched, and leached in accordance with the general procedure described in U.S. Pat. No. 4,772,392. For each example, hollow fibers having a nominal size of about 90 microns internal diameter by about 130 microns external diameter were cut to about 42 inch (106.7 centimeter) lengths and fabricated into a test cell by inserting the fibers into a piece of ½ inch (1.3 centimeters) diameter copper tubing, and potting both ends of the tubing with epoxy resin. The test cell was thoroughly bore flushed with distilled water before being treated with the non-ionic surfactant. The test cell was then thoroughly bore flushed with a solution of non-ionic surfactant in distilled water. The solution of the non-ionic surfactant in distilled water was then passed through the bores of the hollow fibers in the test cell for about 30 to 60 minutes using a pressure drop across the fiber of about 50 psi (344.7 kPa) or 30 psi (206.8 kPa) The test cell was then flushed with distilled water through the bores of the hollow fibers for about 60 minutes using a feed pressure of about 75 psi (517.1 kPa) and an adjusted back pressure of about 25 psi (172.4) kPa. The fibers in the test cell were then dried by passing nitrogen gas through the hollow fiber bores at about 20 psi (137.9 kPa) overnight. Treatment conditions are summarized in Table I for each example. The test cells were evaluated both before and after treatment for single gas permeation and mixed gas recovery performance. Data are summarized in Tables II and III.

TABLE I

| | TREATMENT CONDITIONS | | | | |
|---|---|---|---|---|---|
| Example | Non-ionic Surfactant | HLB Value | Concentration (ppm) | Time (minutes) | Pressure Drop (psi) |
| 1 | TRITON X-100 | 13.5 | 150 | 60 | 50 |
| 2 | TRITON X-100 | 13.5 | 150 | 60 | 50 |
| 3 | TRITON X-100 | 13.5 | 50 | 60 | 50 |
| 4 | TRITON X-100 | 13.5 | 50 | 60 | 50 |
| 5 | TRITON X-100 | 13.5 | 150 | 60 | 50 |
| 6 | TRITON X-100 | 13.5 | 150 | 60 | 25 |
| 7 | TRITON X-100 | 13.5 | 150 | 30 | 25 |
| 8 | TRITON X-100 | 13.5 | 50 | 60 | 50 |
| 9 | TRITON X-100 | 13.5 | 50 | 60 | 25 |
| 10 | TRITON X-100 | 13.5 | 50 | 30 | 25 |
| 11 | ZONYL FSO-100 | 10–13 | 50 | 60 | 50 |
| 12 | ZONYL FSO-100 | 10–13 | 150 | 60 | 50 |
| 13 | ZONYL FSO-100 | 10–13 | 300 | 60 | 50 |
| 14 | ZONYL FSO-100 | 10–13 | 600 | 60 | 50 |
| 15 | TERGITOL NP-4 | 8.9 | 150 | 60 | 50 |
| 16 | TERGITOL NP-6 | 10.9 | 150 | 60 | 50 |
| 17 | TERGITOL NP-7 | 11.7 | 150 | 60 | 50 |
| 18 | TERGITOL NP-10 | 13.6 | 150 | 60 | 50 |
| 19 | TRITON X-102 | 14.6 | 150 | 60 | 50 |

TABLE II

SINGLE GAS PERMEATION

| Example | Oxygen Flux $\frac{cm^3 (STP)}{cm^2 s\, cmHg} \times 10^6$ Untreated | Treated | Percent Flux Change | Separation Factor Oxygen/Nitrogen Untreated | Treated | Percent Separation Factor Change |
|---|---|---|---|---|---|---|
| 1  | 18.4 | 11.6 | −37.0 | 6.4 | 7.5 | +17.2 |
| 2  | 11.8 | 9.2  | −22.0 | 7.4 | 7.9 | +6.8  |
| 3  | 17.0 | 11.7 | −31.2 | 7.1 | 7.8 | +9.0  |
| 4  | 18.0 | 10.4 | −42.2 | 7.0 | 7.6 | +8.6  |
| 5  | 13.7 | 8.5  | −38.0 | 7.6 | 7.9 | +4.0  |
| 6  | 19.2 | 11.2 | −41.7 | 6.7 | 7.6 | +13.4 |
| 7  | 18.7 | 10.8 | −42.3 | 7.0 | 7.7 | +10.0 |
| 8  | 19.3 | 10.6 | −45.1 | 6.8 | 7.4 | +8.8  |
| 9  | 18.1 | 11.5 | −36.5 | 6.5 | 7.5 | +14.4 |
| 10 | 20.0 | 12.5 | −37.5 | 6.9 | 7.7 | +11.6 |
| 11 | 19.0 | 13.7 | −27.9 | 6.9 | 7.5 | +8.7  |
| 12 | 19.4 | 13.6 | −29.9 | 7.0 | 7.6 | +8.6  |
| 13 | 19.2 | 13.6 | −29.1 | 6.9 | 7.4 | +7.3  |
| 14 | 19.6 | 13.1 | −33.1 | 6.8 | 7.5 | +10.3 |
| 15 | 21.7 | 10.7 | −51.0 | 6.8 | 8.1 | +19.0 |
| 16 | 22.4 | 11.5 | −48.8 | 6.6 | 8.0 | +21.1 |
| 17 | 21.6 | 11.5 | −47.0 | 6.7 | 7.7 | +15.9 |
| 18 | 22.5 | 11.9 | −47.2 | 6.9 | 7.8 | +13.9 |
| 19 | 21.5 | 12.7 | −41.1 | 6.8 | 7.7 | +13.5 |

TABLE III

MIXED GAS RECOVERY*

| Example | Percent Oxygen in Non-Permeate Untreated | Treated | Percent Recovery Untreated | Treated |
|---|---|---|---|---|
| 1 | 0.60 | 0.75 | 34.2 | 38.3 |
|   | 1.02 | 1.00 | 37.3 | 40.4 |
|   | 1.40 | 1.20 | 40.1 | 42.0 |
| 2 | 0.75 | 0.62 | 35.3 | 37.5 |
|   | 1.02 | 0.95 | 38.2 | 40.7 |
|   | 1.30 | 1.45 | 40.1 | 44.4 |
| 3 | 0.70 | 0.65 | 33.0 | 38.8 |
|   | 1.05 | 1.01 | 36.9 | 41.7 |
|   | 1.40 | 1.42 | 39.4 | 44.6 |
| 4 | 0.65 | 0.62 | 32.1 | 37.0 |
|   | 1.02 | 1.00 | 36.6 | 41.1 |
|   | 1.35 | 1.38 | 39.2 | 43.5 |
| 5  | 1 | 1 | 39.6 | 40.5 |
| 6  | 1 | 1 | 35.1 | 39.5 |
| 7  | 1 | 1 | 37.1 | 40.2 |
| 8  | 1 | 1 | 37.6 | 39.9 |
| 9  | 1 | 1 | 36.3 | 39.5 |
| 10 | 1 | 1 | 37.2 | 39.4 |
| 11 | 1 | 1 | 36.0 | 39.5 |
| 12 | 1 | 1 | 37.1 | 39.8 |
| 13 | 1 | 1 | 35.2 | 38.0 |
| 14 | 1 | 1 | 35.2 | 39.1 |
| 15 | 1 | 1 | 38.6 | 42.1 |
| 16 | 1 | 1 | 29.3 | 41.6 |
| 17 | 1 | 1 | 38.1 | 41.1 |
| 18 | 1 | 1 | 38.5 | 41.8 |
| 19 | 1 | 1 | 38.6 | 41.1 |

*feed gas = air at 25° C.

What is claimed is:

1. A method for separating at least one gaseous component from at least one other gaseous component in a gas mixture comprising:

A. contacting one side of a semi-permeable gas separation membrane with a feed gas mixture under pressure, wherein said membrane separates a higher pressure region on one side of the membrane from a lower pressure region on the opposite side of said membrane;

B. maintaining a pressure differential across said membrane under conditions such that at least one gaseous component in the feed gas mixture selectively permeates through the membrane from the higher pressure region to the lower pressure region;

C. removing from the lower pressure region permeated gas which is enriched in at least one gaseous component; and D. removing from the higher pressure region non-permeated gas which is depleted in at least one gaseous component;

wherein said membrane comprises:

at least one discriminating region and at least one porous region, wherein said discriminating region functions to selectively separate at least one gaseous component from at least one other gaseous component in a gas mixture, wherein said discriminating region and said porous region are comprised of a polymer selected from the group consisting of a polycarbonate, a polyester, a polyestercarbonate, and a combination thereof, wherein said porous region comprises a plurality of pores having an effective average pore size in the range of up to about 500 Angstroms; and a non-ionic surfactant disposed on at least one surface of said membrane, wherein said non-ionic surfactant is characterized by an HLB value of between about 8.0 and about 17.0;

wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

2. The method of claim 1 wherein said polymer is derived from bisphenols wherein at least about 25 weight percent of the bisphenol moieties in the polymer backbone are tetra-substituted.

3. The method of claim 1 wherein said polymer comprises a polymer backbone structure of the formula:

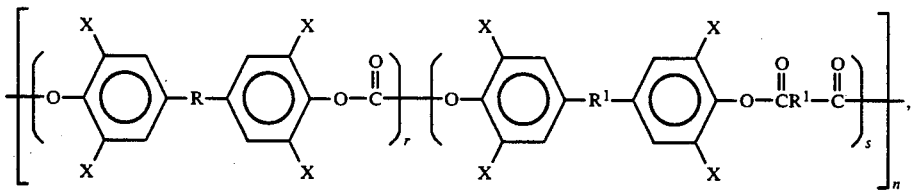

wherein
- R is independently in each occurrence selected from the group consisting of a direct bond, —CO—, —CO$_2$—, —S—, —SO$_2$—, —SO—, —O—, a C$_{1-12}$ divalent hydrocarbon radical, a C$_{1-12}$ divalent halocarbon radical, and an inertly substituted C$_{1-12}$ divalent hydrocarbon radical;
- R$^1$ is independently in each occurrence selected from the group consisting of a C$_{1-18}$ divalent hydrocarbon radical, an inertly substituted C$_{1-18}$ divalent hydrocarbon radical, and a C$_{1-18}$ divalent halocarbon radical;
- X is independently in each occurrence selected from the group consisting of hydrogen, a halogen, a C$_{1-6}$ alkyl, a C$_{1-4}$ haloalkyl, and a C$_{1-4}$ alkoxy;
- r is a positive real number between 0 and 1 inclusive;
- s is a positive real number between 0 and 1 inclusive; and
- n is a positive real number, such that the polymer possesses sufficient molecular weight to prepare a membrane with suitable characteristics.

4. The method of claim 3 wherein n is a positive real number of at least about 10.

5. The method of claim 4 wherein R is independently in each occurrence selected from the group consisting of a direct bond, —CO—, —CO$_2$—, —S—, —SO—, —SO$_2$—, —O—, a C$_{1-8}$ divalent hydrocarbon radical, a C$_{1-8}$ divalent halocarbon radical, and an inertly substituted C$_{1-8}$ divalent hydrocarbon radical.

6. The method of claim 5 wherein R is independently in each occurrence selected from the group consisting of a C$_{1-3}$ divalent hydrocarbon radical, a C$_{1-3}$ divalent halocarbon radical, and an inertly substituted C$_{1-3}$ divalent hydrocarbon radical.

7. The method of claim 5 wherein R$^1$ is independently in each occurrence selected from the group consisting of an unsubstituted or halo-substituted C$_{1-12}$ divalent aliphatic hydrocarbon radical, an unsubstituted or halo-substituted C$_{5-18}$ divalent cycloaliphatic hydrocarbon radical, and an unsubstituted or halo-substituted C$_{6-18}$ divalent aromatic hydrocarbon radical.

8. The method of claim 7 wherein X is independently in each occurrence selected from the group consisting of hydrogen, a halogen, a C$_{1-4}$ alkyl, and a C$_{1-4}$ alkoxy.

9. The method of claim 8 wherein X is independently in each occurrence selected from the group consisting of chlorine, bromine, and fluorine.

10. The method of claim 8 wherein the ratio s/r is in the range of from about 0.005 to about 200.

11. The method of claim 8 wherein the non-ionic surfactant is characterized by an HLB valve of between about 8.25 and about 16.0.

12. The method of claim 11 wherein within the porous region, a substantial majority of the pores are between about 10 Angstroms and about 300 Angstroms in size.

13. The method of claim 12 wherein the membrane is a hollow fiber.

14. The method of claim 13 wherein said hollow fiber membrane comprises a generally porous region at or near the external surface of the hollow fiber membrane, a generally porous region at or near the internal surface of the hollow fiber membrane, and a discriminating region generally situated between the two porous surface regions.

15. The method of claim 13 wherein said hollow fiber membrane comprises a thin discriminating region at or near the internal surface of the hollow fiber membrane and a generally porous region extending from the discriminating region to the external surface of the hollow fiber membrane.

16. The method of claim 14 or 15 wherein said membrane exhibits at least about a 40 percent recovery at about 25° C. based on air as the feed gas with about 1.0 percent oxygen in the non-permeate.

17. The method of claim 16 wherein the oxygen flux through the membrane is at least about 6×10$^{-6}$ cm$^3$ (STP)/(cm$^2$s cmHg).

18. The method of claim 17 wherein the gas separation factor for oxygen/nitrogen at about 25° C. is at least about 7.5.

19. The method of claim 12 wherein the feed gas mixture contains at least one of the gases selected from the group consisting of hydrogen, helium, oxygen, nitrogen, carbon monoxide, carbon dioxide, water vapor, ammonia, hydrogen sulfide, and light hydrocarbons.

20. The method of claim 19 wherein the feed pressure is between about 35 psig and about 2000 psig.

21. The method of claim 20 wherein the temperature is between about 0° C. and about 150° C.

22. A semi-permeable gas separation membrane comprising:
at least one discriminating region and at least one porous region, wherein said discriminating region functions to selectively separate at least one gaseous component from at least one other gaseous component in a gas mixture, wherein said discriminating region and said porous region are comprised of a polymer selected from the group consisting of a polycarbonate, a polyester, a polyestercarbonate, and a combination thereof, wherein said porous region comprises a plurality of pores having an effective average pore size in the range of up to about 500 Angstroms; and
a non-ionic surfactant disposed on at least one surface of said membrane, wherein said non-ionic surfactant is characterized by an HLB value of between about 8.0 and about 17.0;
wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

23. The membrane of claim 22 wherein said polymer is derived from bisphenols wherein at least about 25 weight percent of the bisphenol moieties in the polymer backbone are tetra-substituted.

24. The membrane of claim 23 wherein said polymer is derived from bisphenols wherein at least about 50 weight percent of the bisphenol moieties in the polymer backbone are tetra-substituted.

25. The membrane of claim 24 wherein said polymer is derived from bisphenols wherein at least about 75 weight percent of the bisphenol moieties in the polymer backbone are tetra-substituted.

26. The membrane of claim 22 wherein said polymer comprises a structure of the formula:

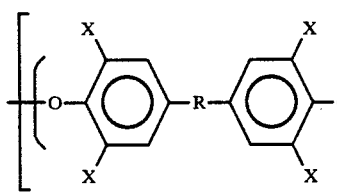 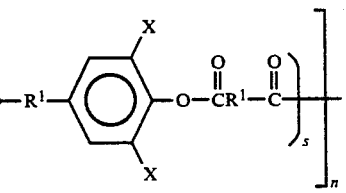

wherein
R is independently in each occurrence selected from the group consisting of a direct bond, —CO—, —CO$_2$—, —S—, —SO$_2$—, —SO—, —O—, a C$_{1-12}$ divalent hydrocarbon radical, a C$_{1-12}$ divalent halocarbon radical, and an inertly substituted C$_{1-12}$ divalent hydrocarbon radical;

R$^1$ is independently in each occurrence selected from the group consisting of a C$_{1-18}$ divalent hydrocarbon radical, an inertly substituted C$_{1-18}$ divalent hydrocarbon radical, and a C$_{1-18}$ divalent halocarbon radical;

X is independently in each occurrence selected from the group consisting of hydrogen, a halogen, a C$_{1-6}$ alkyl, a C$_{1-4}$ haloalkyl, and a C$_{1-4}$ alkoxy;

r is a positive real number between 0 and 1 inclusive;
s is a positive real number between 0 and 1 inclusive; and
n is a positive real number, such that the polymer possesses sufficient molecular weight to prepare a membrane with suitable characteristics.

27. The membrane of claim 26 wherein n is a positive real number of at least about 10.

28. The membrane of claim 27 wherein R is independently in each occurrence selected from the group consisting of a direct bond, —CO—, —CO$_2$—, —S—, —SO$_2$—, —SO—, —O—, a C$_{1-8}$ divalent hydrocarbon radical, a C$_{1-8}$ divalent halocarbon radical, and an inertly substituted C$_{1-8}$ divalent hydrocarbon radical.

29. The membrane of claim 28 wherein R is independently in each occurrence selected from the group consisting of a direct bond, a C$_{1-6}$ divalent hydrocarbon radical, a C$_{1-6}$ divalent halocarbon radical, and an inertly substituted divalent hydrocarbon radical.

30. The membrane of claim 29 wherein R is independently in each occurrence selected from the group consisting of a C$_{1-3}$ divalent hydrocarbon radical, a C$_{1-3}$ divalent halocarbon radical, and an inertly substituted C$_{1-3}$ divalent hydrocarbon radical.

31. The membrane of claim 7 wherein R$^1$ is independently in each occurrence selected from the group consisting of an unsubstituted or halo-substituted C$_{1-12}$ divalent aliphatic hydrocarbon radical, an unsubstituted or halo-substituted C$_{5-18}$ divalent cycloaliphatic hydrocarbon radical, or an unsubstituted or halo-substituted C$_{6-18}$ divalent aromatic hydrocarbon radical.

32. The membrane of claim 31 wherein X is independently in each occurrence selected from the group consisting of hydrogen, a halogen, a C$_{1-4}$ alkyl, and a C$_{1-4}$ alkoxy.

33. The membrane of claim 32 wherein X is independently in each occurrence selected from the group consisting of hydrogen, chlorine, bromine, fluorine, methyl, ethyl, methoxy, and ethoxy.

34. The membrane of claim 33 wherein X is independently in each occurrence selected from the group consisting of chlorine, bromine, fluorine, and methyl.

35. The membrane of claim 34 wherein X is independently in each occurrence selected from the group consisting of chlorine, bromine, and fluorine.

36. The membrane of claim 32 wherein the ratio s/r is in the range of from about 0.005 to about 200.

37. The membrane of claim 32 wherein the non-ionic surfactant is characterized by an HLB value of between about 8.25 and about 16.0.

38. The membrane of claim 37 wherein the non-ionic surfactant is selected from the group consisting of alcohol ethoxylate non-ionic surfactants, polyoxyethylenated polyoxypropylene glycol non-ionic surfactants, alkyl poly(ethylene glycol)ether non-ionic surfactants, alkylphenol ethoxylate non-ionic surfactants, and fluorinated non-ionic surfactants.

39. The membrane of claim 37 wherein within the porous region, a substantial majority of the pores are between about 10 Angstroms and about 300 Angstroms in size.

40. The membrane of claim 37 wherein the membrane is a hollow fiber.

41. The membrane of claim 40 wherein the hollow fiber membrane comprises a generally porous region at or near the external surface of the hollow fiber membrane, a generally porous region at or near the internal surface of the hollow fiber membrane, and a discriminating region generally situated between the two porous surface regions.

42. The membrane of claim 40 wherein the hollow fiber membrane comprises a thin discriminating region at or near the internal surface of the hollow fiber membrane and a generally porous region extending from the discriminating region to the external surface of the hollow fiber membrane.

43. The membrane of claim 41 or 42 wherein said membrane exhibits at least about a 40 percent recovery at about 25° based on air as the feed gas with about 1.0 percent oxygen in the non-permeate.

44. The membrane of claim 43 wherein the oxygen flux through the membrane is at least about 6×10$^{-6}$ cm$^3$(STP)/(cm$^2$s cmHg).

45. The membrane of claim 44 wherein the gas separation factor for oxygen/nitrogen at about 25° C. is at least about 7.5.

46. A process for preparing a semi-permeable gas separation membrane comprising the steps of:
A. forming a mixture comprising:

(i) at least one polymer selected from the group consisting of polycarbonate, polyester, polyestercarbonate, and a combination thereof, and (ii) at least one solvent for said polymer, B. heating said mixture to a temperature at which said mixture forms a fluid and possesses sufficient viscosity at extrusion or casting conditions to permit fabrication of a membrane:

C. extruding or casting said fluid into a membrane;

D. passing said membrane through at least one gaseous quench zone under conditions such that said mixture cools and begins to phase separate;

E. passing said membrane through at least one liquid quench zone comprising a liquid in which said polymer possesses low solubility, wherein at least a portion of said solvent and optional non-solvent is removed from said membrane;

F. simultaneously or consecutively passing said membrane through at least one liquid leach zone comprising a liquid in which said polymer possesses low solubility, wherein a substantial portion of the remaining solvent and optional non-solvent is removed from said membrane; and G. contacting at least one surface of said membrane with a non-ionic surfactant which possesses an HLB value of between about 8.0 and about 17.0;

wherein said membrane so formed comprises at least one discriminating region and at least one porous region, wherein said discriminating region functions to selectively separate at least one gaseous component from at least one other gaseous component in a gas mixture, and wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

47. A process for preparing a semi-permeable gas separation membrane comprising:

A. forming a mixture comprising:
(i) at least one polymer selected from the group consisting of polycarbonate, polyester, polyestercarbonate, and a combination thereof,
(ii) at least one solvent for said polymer, and
(iii) at least one non-solvent for said polymer;

B. heating said mixture to a temperature at which said mixture forms a fluid and possesses sufficient viscosity at extrusion or casting conditions to permit fabrication of a membrane;

C. extruding or casting said fluid into a membrane;

D. passing said membrane through at least one gaseous quench zone under conditions such that said mixture cools and begins to phase separate;

E. passing said membrane through at least one liquid quench zone comprising a liquid in which said polymer possesses low solubility, wherein at least a portion of said solvent and optional non-solvent is removed from said membrane;

F. simultaneously or consecutively passing said membrane through at least one liquid leach zone comprising a liquid in which said polymer possesses low solubility, wherein a substantial portion of the remaining solvent and optional non-solvent is removed from said membrane; and G. contacting at least one surface of said membrane with a non-ionic surfactant which possesses an HLB value of between about 8.0 and about 17.0; wherein said membrane so formed comprises at least one discriminating region and at least one porous region, wherein said discriminating region functions to selectively separate at least one gaseous component from at least one other gaseous component in a gas mixture, and wherein said membrane exhibits a gas selectivity for oxygen/nitrogen at about 25° C. of at least about 7.0 and a recovery based on air as the feed gas with about 1.0 percent oxygen in the non-permeate of at least about 38 percent at about 25° C.

48. The process of claim 47 wherein said polymer is derived from bisphenols wherein at least about 25 weight percent of the bisphenol moieties in the polymer backbone are tetra-substituted.

49. The process of claim 47 wherein said polymer comprises a polymer backbone structure of the formula:

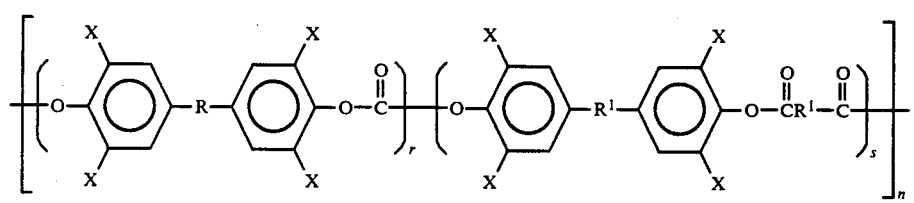

wherein

R is independently in each occurrence selected from the group consisting of a direct bond, —CO—, —CO$_2$—, —S—, —SO$_2$—, —SO—, —O—, a C$_{1-12}$ divalent hydrocarbon radical, a C$_{1-12}$ divalent halocarbon radical, and an inertly substituted C$_{1-12}$ divalent hydrocarbon radical;

R$^1$ is independently in each occurrence selected from the group consisting of a C$_{1-18}$ divalent hydrocarbon radical, an inertly substituted C$_{1-18}$ divalent hydrocarbon radical, and a C$_{1-18}$ divalent halocarbon radical;

X is independently in each occurrence selected from the group consisting of hydrogen, a halogen, a C$_{1-6}$ alkyl, a C$_{1-4}$ haloalkyl, and a C$_{1-4}$ alkoxy;

r is a positive real number between 0 and 1 inclusive;

s is a positive real number between 0 and 1 inclusive; and n is a positive real number, such that the polymer possesses sufficient molecular weight to prepare a membrane with suitable characteristics.

50. The process of claim 49 wherein n is a positive real number of at least about 10.

51. The process of claim 50 wherein R is independently in each occurrence selected from the group consisting of a direct bond, —CO—, —CO$_2$—, —S—, —SO$_2$, —SO—, —O—, a C$_{1-8}$ divalent hydrocarbon radical, a C$_{1-8}$ divalent halocarbon radical, and an inertly substituted C$_{1-8}$ divalent hydrocarbon radical.

52. The process of claim 51 wherein R is independently in each occurrence consisting of a C$_{1-3}$ divalent hydrocarbon radical, a C$_{1-3}$ divalent halocarbon radical, and an inertly substituted $C_{1-3}$ divalent hydrocarbon radical.

53. The process of claim 51 wherein $R^1$ is independently in each occurrence selected from the group consisting of an unsubstituted or halo-substituted $C_{1-12}$ divalent aliphatic hydrocarbon radical, an unsubstituted or halo-substituted $C_{5-18}$ divalent cycloaliphatic hydrocarbon radical, or an unsubstituted or halo-substituted $C_{6-18}$ divalent aromatic hydrocarbon radical.

54. The process of claim 53 wherein X is independently in each occurrence selected from the group consisting of hydrogen, a halogen, a $C_{1-4}$ alkyl, and a $C_{1-4}$ alkoxy.

55. The process of claim 54 wherein X is independently in each occurrence selected from the group consisting of chlorine, bromine, and fluorine.

56. The process of claim 54 wherein the ratio s/r is in the range of from about 0.005 to about 200.

57. The process of claim 54 wherein the non-ionic surfactant is characterized by an HLB value of between about 8.25 and about 16.0.

58. The process of claim 57 wherein within the porous region, a substantial majority of the pores are between about 10 Angstroms and about 300 Angstroms in size.

59. The process of claim 58 wherein said membrane is a hollow fiber.

60. The process of claim 59 wherein said hollow fiber membrane comprises a generally porous region at or near the external surface of the hollow fiber membrane, a generally porous region at or near the internal surface of the hollow fiber membrane, and a discriminating region generally situated between the two porous surface regions.

61. The process of claim 59 wherein said hollow fiber membrane comprises a thin discriminating region at or near the internal surface of the hollow fiber membrane and a generally porous region extending from the discriminating region to the external surface of the hollow fiber membrane.

62. The process of claim 60 or 61 wherein said membrane exhibits at least about a 40 percent recovery at about 25° C. based on air as the feed gas with about 1.0 percent oxygen in the non-permeate.

63. The process of claim 61 wherein the oxygen flux through the membrane is at least about $6 \times 10^{-6}$ cm$^3$ (STP)/(cm$^2$s cmHg).

64. The process of claim 63 wherein the gas separation factor for oxygen/nitrogen at about 25° C. is at least about 7.5.

65. The process of claim 57 wherein the temperature, relative humidity, and residence time in the gaseous quench zone are such that water diffuses substantially into the membrane before passing into the liquid quench zone.

66. The process of claim 65 wherein the extrusion temperature is between about 50° C. and about 280° C.

67. The process of claim 66 wherein the gaseous quench zone comprises air.

68. The process of claim 67 wherein the gaseous quench zone temperature is in the range of from about 0° C. to about 120° C.

69. The process of claim 68 wherein the gaseous quench zone relative humidity at about 24° C. is in the range of from about 20 percent to about 80 percent.

70. The process of claim 69 wherein the residence time within the gaseous quench zone is between about 0.05 seconds and about 10 seconds.

71. The process of claim 70 wherein said liquid quench zone comprises lower alcohols, water, fluorocarbons, lower aliphatic hydrocarbons, or mixtures thereof.

72. The process of claim 71 wherein said membrane is passed through at least one liquid quench zone and at least one liquid leach zone wherein the membrane is passed through the liquid quench zone under conditions such that the mixture undergoes at least partial phase separation in said liquid quench zone, and the membrane is then passed through the liquid leach zone under conditions such that the solvent and non-solvent are substantially removed from the membrane and phase separation is substantially completed.

73. The process of claim 71 wherein the liquid quench zone temperature is in the range of from about 0° C. to about 30° C.

74. The process of claim 73 wherein the residence time within the liquid quench zone is between about 0.05 seconds and about 600 seconds.

75. The process of claim 74 wherein said liquid quench zone comprises water.

76. The process of claim 74 wherein said liquid leach zone comprises lower alcohols, water, fluorocarbons, lower aliphatic hydrocarbons, or mixtures thereof.

77. The process of claim 76 wherein the liquid leach zone temperature is in the range of from about 50° C. to about 120° C.

78. The process of claim 77 wherein residence time within the liquid leach zone is between about 0.5 minutes and about 240 minutes.

79. The process of claim 78 wherein the liquid leach zone comprises water.

80. The process of claim 78 wherein said solvent comprises a glycol ether corresponding to the formula $R^3O-(CH_2CH_2O)_d-R^3$ wherein $R^3$ is independently in each occurrence methyl or ethyl, and d is an integer of between about 1 and about 20; a dialkyl ketone wherein the alkyl groups independently are methyl or ethyl; morpholine substituted on the nitrogen atom with an alkyl, formyl, or alkanoyl moiety; pyrrolidinone or N-$C_{1-4}$ alkyl, N-$C_{5-6}$ cycloalkyl, N-$C_{6-10}$ aryl, or alkaryl substituted pyrrolidinone; $C_{1-4}$ alkoxycarbonyl, formyl, nitro, or halo substituted benzene; tetrahydrofuran; dimethyl formamide; cyclohexanone; N,N-dimethyl acetamide; acetophenone; methylene chloride; sulfolane; cyclohexyl acetate; 1,1,3,3-tetramethylurea; isophorone; caprolactone; 1-formylpiperidine; methyl salicylate; hexymethylphosphoramide; phenyl ether; bromoanaphthalene; or mixtures thereof.

81. The process of claim 80 wherein said solvent comprises N-methyl-2-pyrrolidinone, ethylene glycol dimethyl ether, tetrahydrofuran, diethylene glycol dimethyl ether, acetophenone, methylene chloride, cyclohexanone, or mixtures thereof.

82. The process of claim 80 wherein said non-solvent comprises glycols and glycol ethers corresponding to the formula $R^4O-(CH_2CH_2O)q-R^4$ wherein $R^4$ is independently in each occurrence hydrogen or $C_{1-4}$ alkyl, and q is an integer of about 1 to about 250; esters corresponding to the formula $R^5COOR^6$ wherein $R^5$ is hydrogen or $C_{1-19}$ alkyl, and $R^6$ is $C_{1-10}$ alkyl; alkanols selected from the group consisting of methanol, ethanol, 2-propanol, and 1-hexanol; cyclohexanes which are unsubstituted or substituted with a $C_{1-10}$ alkyl, $C_{3-10}$ cycloalkyl or $C_{1-4}$ perfluoroalkyl moiety; $C_{5-20}$ alkanes; dialkyl ketones consisting of ketones wherein one of the alkyl moieties is $C_{3-10}$ and the other is $C_{1-10}$; amides corresponding to the formula R$^7$CONHR$^8$ wherein R$^7$ is hydrogen or C$_{1-3}$ alkyl, and R$^8$ is C$_{1-4}$ alkyl; acetyl and C$_{1-3}$ alkyl nitriles; C$_{1-4}$ alkylaldehydes; formyl, alkyl, and cycloalkyl substituted benzenes corresponding to the formula:

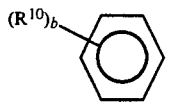

wherein R$^{10}$ is C$_{1-10}$ alkyl, C$_{3-10}$ cycloalkyl, or formyl, and b is an integer between about 1 and about 6; or mixtures thereof.

83. The process of claim 82 wherein said non-solvent comprises triethylene glycol, 2-ethoxyethanol, diethylene glycol dibutyl ether, polyethylene glycols with molecular weights of up to about 1450, diethylene glycol, dodecane, hexadecane, cyclohexane, methylcyclohexane, perchloroethylene, diisopropylketone, isopropylketone, isoproprylcyclohexane, t-butylcyclohexane, N-methylformamide, decyclene, N-methylacetamide, tetralin, cyclohexyl, cyclohexyl benzene, diethylene glycol dibutylether, carbon tetrachloride, water, or mixtures thereof.

84. The process of claim 83 wherein said solvent and non-solvent comprise N-methyl-2-pyrrolidinone and triethylene glycol, N-methyl-2-pyrrolidinone and polyethylene glycol with a molecular weight of up to about 1450, ethylene glycol dimethylether and water, tetrahydrofuran and water, ethylene glycol dimethylether and diisopropylketone, tetrahydrofuran and diisopropylketone, diethylene glycol dimethyl ether and water, diethylene glycol dimethylether and tetraethylene glycol dimethylether, acetophenone and diethylene glycol dibutylether, methylene chloride and carbon tetrachloride, cyclohexanone and dodecane, and acetophenone and hexadecane.

85. The process of claim 84 wherein said solvent and non-solvent comprise N-methyl-2-pyrrolidinone and triethylene glycol, or N-methyl-2-pyrrolidinone and polyethylene glycol with a molecular weight of up to about 400.

* * * * *